United States Patent
Taylor et al.

(10) Patent No.: US 8,706,910 B2
(45) Date of Patent: Apr. 22, 2014

(54) DYNAMICALLY ADAPTIVE NETWORK-BASED DATA PROCESSING SYSTEM AND METHOD

(75) Inventors: John Richard Taylor, Tiburon, CA (US); Randy Yen-pang Chou, San Jose, CA (US)

(73) Assignee: Panzura, Inc., San Jose, CA (US)

( * ) Notice: Subject to any disclaimer, the term of this patent is extended or adjusted under 35 U.S.C. 154(b) by 823 days.

(21) Appl. No.: 12/259,945

(22) Filed: Oct. 28, 2008

(65) Prior Publication Data

US 2010/0106770 A1    Apr. 29, 2010

(51) Int. Cl.
   *G06F 15/16*   (2006.01)
(52) U.S. Cl.
   USPC .......................................... 709/246; 709/247
(58) Field of Classification Search
   None
   See application file for complete search history.

(56) References Cited

U.S. PATENT DOCUMENTS

| | | | |
|---|---|---|---|
| 6,378,053 B1 * | 4/2002 | Lamaire et al. | 711/159 |
| 6,470,378 B1 * | 10/2002 | Tracton et al. | 709/203 |
| 6,483,851 B1 * | 11/2002 | Neogi | 370/466 |
| 6,487,538 B1 | 11/2002 | Gupta et al. | |
| 6,813,641 B2 * | 11/2004 | Fomenko et al. | 709/230 |
| 6,912,691 B1 * | 6/2005 | Dodrill et al. | 715/234 |
| 6,925,595 B1 * | 8/2005 | Whitledge et al. | 715/234 |
| 7,127,493 B1 * | 10/2006 | Gautier | 709/217 |
| 7,302,481 B1 * | 11/2007 | Wilson | 709/224 |
| 7,328,283 B2 * | 2/2008 | Tan et al. | 709/247 |
| 7,444,418 B2 * | 10/2008 | Chou et al. | 709/231 |
| 7,596,564 B1 * | 9/2009 | O'Connell et al. | 1/1 |
| 7,747,782 B2 * | 6/2010 | Hunt et al. | 709/246 |
| 7,808,932 B2 * | 10/2010 | Chen et al. | 370/270 |
| 2002/0013833 A1 * | 1/2002 | Wyatt et al. | 709/220 |
| 2002/0116518 A1 * | 8/2002 | Silen et al. | 709/231 |
| 2002/0169891 A1 * | 11/2002 | Sasaki et al. | 709/245 |
| 2003/0018794 A1 * | 1/2003 | Zhang et al. | 709/231 |
| 2003/0018796 A1 * | 1/2003 | Chou et al. | 709/231 |
| 2003/0149765 A1 * | 8/2003 | Hubbard et al. | 709/224 |
| 2003/0187746 A1 * | 10/2003 | Kochanski | 705/26 |
| 2003/0190030 A1 * | 10/2003 | Alton | 379/219 |
| 2004/0064577 A1 * | 4/2004 | Dahlin et al. | 709/235 |
| 2004/0186897 A1 * | 9/2004 | Knauerhase et al. | 709/209 |
| 2008/0005323 A1 * | 1/2008 | Shinkai et al. | 709/224 |
| 2008/0288983 A1 | 11/2008 | Johnson et al. | |
| 2009/0031381 A1 | 1/2009 | Cohen et al. | |
| 2009/0254672 A1 * | 10/2009 | Zhang | 709/231 |

OTHER PUBLICATIONS

Diamond, Tom, "FPOAs Meet the Challenges of H.264 Encoding of High Definition Video", http://www.fpgajournal.com/articles_2007/20070731_mathstar.htm, MathStar, Jul. 2007.
Richardson, Iain E.G., "Overview of H.264", www.vcodex.com/files/h264_overview_orig.pdf, Jul. 2002.
Wiegand, Thomas, et al., "Overview of the H.264/AVC Video Coding Standard", IEEE Trans. on Circuits and Systems for Video Tech., vol. 13, No. 7, pp. 560-576, Jul. 2003.

* cited by examiner

*Primary Examiner* — Brian P Whipple
(74) *Attorney, Agent, or Firm* — Park, Vaughan, Fleming & Dowler LLP; Mark D. Spiller

(57) ABSTRACT

According to one embodiment of the invention, a method is devised for tailoring downloaded content to the requesting device by receiving attribute parameters associated with a device that initiates a request for downloaded content. The attribute parameters are values that identify specific characteristics of the device. Thereafter, the content is modified according to the attributes parameters, and thereafter, the modified content is transmitted to the device.

20 Claims, 6 Drawing Sheets

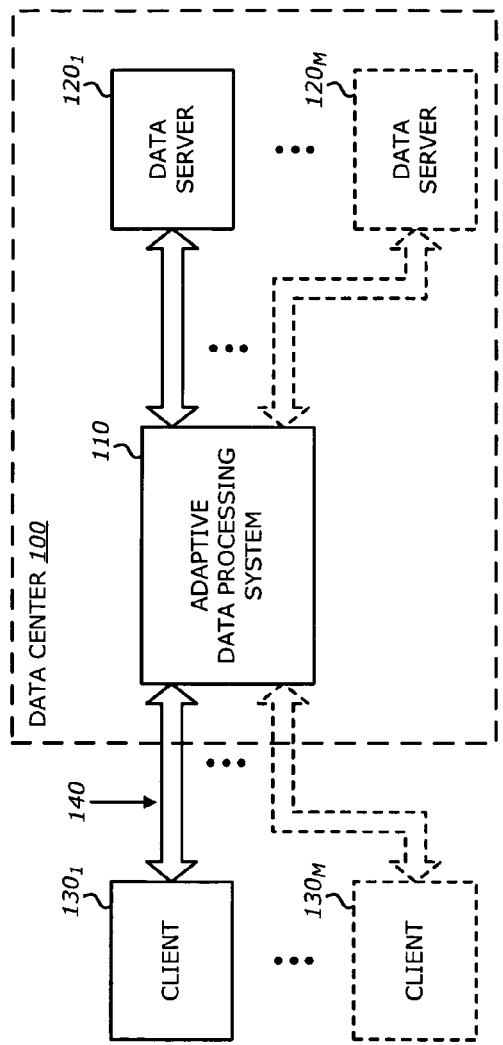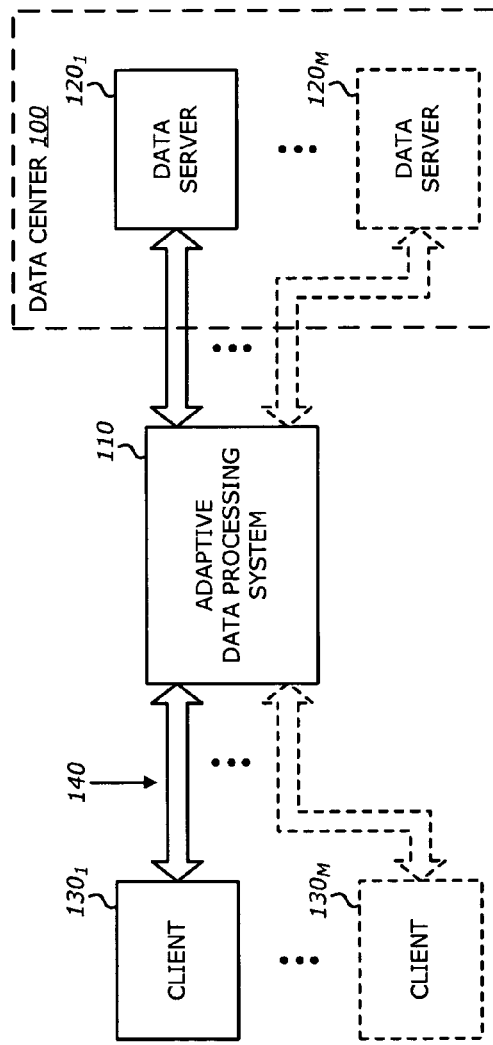

DYNAMICALLY ADAPTIVE NETWORK-BASED DATA PROCESSING SYSTEM AND METHOD

FIELD

The subject matter of this application is related to the subject matter in a co-pending non-provisional application by the same inventors as the instant application, entitled "User-Targeted Content Processing System and Method," having Ser. No. 12/259,958, and filing date 28 Oct. 2008. The subject matter of this application is also related to the subject matter in a co-pending non-provisional application by the same inventors as the instant application, entitled "Network-Attached Media Plug-In," having Ser. No. 12/260,034, and filing date 28 Oct. 2008. The subject matter of this application is also related to the subject matter in a co-pending non-provisional application by John Richard Taylor, Randy Yen-pang Chou, and Joel Frederic Adam, entitled "Real-Time Network Video Processing," having Ser. No. 12/260,032, and filing date 28 Oct. 2008.

Embodiments of the invention generally relate to a system and method for dynamically adjusting characteristics of content to be downloaded, such as the bit rate for example, based on the attributes of the electronic device targeted to receive the downloaded content.

GENERAL BACKGROUND

The Internet is a decentralized public network of electronic devices that are communicatively connected together on a global scale. A message can be sent from any electronic device on the Internet to any other electronic device simply by specifying a targeted destination address for the message at transmission. The message will likely experience a series of intermediary devices, such as bridges and routers, which receive the message in transit, determine the intended destination of the message, and continue routing the message to its intended destination.

The popularity and use of the Internet continues to increase at a rapid rate. Since the introduction of the World Wide Web, referred to as the "Web," most Internet users are provided with a graphical user interface (GUI) to the Internet, which allows the users to access Web pages stored on servers located worldwide. These "Web pages" feature text and graphics and are generally described, in terms of layout and content, by way of a programming language known as HyperText Markup Language (HTML).

A software program, known as a "browser," is executed at an electronic device controlled by the user (referred to as a "client device") and enables the user to control the access and viewing of these Web pages by either (i) specifying the location, namely the targeted Internet address of the desired Web page, or (ii) "linking" to Web pages. The desired Web page is specified by a uniform resource locator (URL), which indicates the precise location of the HTML file. "Linking," however, is accomplished by the desired Web page containing, in addition to textual and visual data specified in HTML format, embedded information referred to as "links" in the form of URLs that point to Internet addresses of other Web pages. These other Web pages are often maintained on other electronic devices throughout the Internet.

The user, by selecting a link or an image embedded with a link (often by selecting the link or image with an input device), accesses content within other Web pages, which can in turn contain further data and/or additional links. When a Web page is accessed, its information is transmitted across the Internet to the client device accessed by the user.

Over the last few years, more and more data centers have emerged for hosting multimedia content, such as video files, for public viewing. Video files normally have extremely high storage and bandwidth requirements. In particular, video files can be very large, from approximately a few megabytes and up to one gigabyte or more.

In order to play back a video file at a client device, a web server storing the video file normally receives a request for the video file and downloads the entire (or a substantial part of the) video file to the client device for temporary storage prior to playback. This is done in order to avoid jerky display of the video file. However, in most cases when surfing the Web, only a small portion of the video file is viewed, and thus, the downloading of the entire (or a substantial part of the) video file wastes bandwidth. This wasted bandwidth translates into added expenses incurred by the data centers.

Moreover, due to an increasing number of electronic devices that are adapted to display video in different formats and resolutions, the web servers are being required to support and maintain a larger number of video files. It is not uncommon to store multiple copies of a particular video in order to accommodate different formats and resolutions. Otherwise, some electronic devices will not be able to view the hosted video files, which would result in a loss of realized revenue by the data center. This repetitive storage of video files poses a number of problems.

For instance, as the number of copies of video files increases over time, the host site will experience more difficulty in managing its video files. Also, as new formats and resolutions are supported by the host site, legacy videos also will need to be pre-processed to support the new format(s) and/or resolution(s) if access to the video file by an electronic device supporting this format and/or resolution is permitted.

Accordingly, a need exists for a system capable of providing improved access to audio/video content on the Internet or another general purpose network. Such a system would take steps to ensure that content is delivered properly through dynamic adjustment of various characteristics of the content based on the attributes of the client device.

BRIEF DESCRIPTION OF THE DRAWINGS

Features and advantages of embodiments of the invention will become apparent from the following detailed description in which:

FIGS. 1A and 1B are exemplary embodiments of an adaptive data processing system deployed between one or more data servers and a client device.

DETAILED DESCRIPTION

Figure 2:
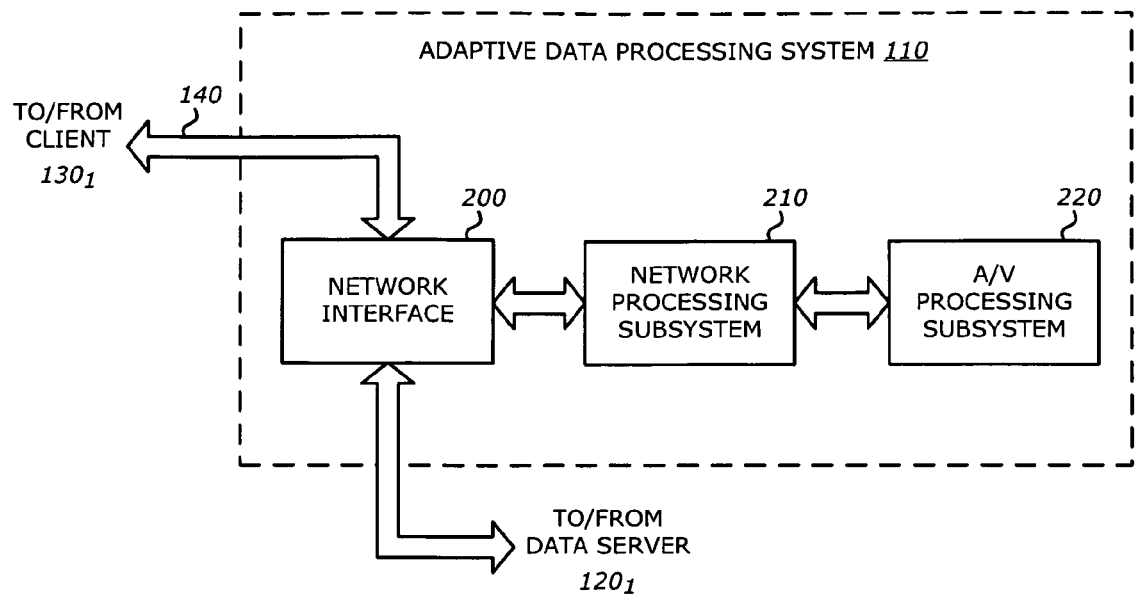
FIG. 2 is a block diagram of an exemplary embodiment of the adaptive data processing system of FIGS. 1A and 1B.

Embodiments of the invention set forth in the following detailed description generally relate to a method, system and software for dynamically adjusting the properties of downloaded content in accordance with the attributes of the client device intended to receive the content. As an example of one embodiment of the invention, attribute parameters of the client device, namely values that identify specific characteristics of the device, may include but are not limited or restricted to the following: supported format type, display screen resolution, operating system (OS) type/version, processor type, processing speed and compression type supported. The attribute parameters are received as part of or in addition to a Request message for content. Examples of Request messages include, but are not limited or restricted a Hypertext Transfer Protocol (HTTP) Request message or a Real Time Streaming Protocol (RTSP) Request message. These attribute parameters are subsequently used to adjust the downloaded content. Such adjustment may involve alteration of the transmission rate, format, resolution, compression type, or the like.

The embodiments of the invention are directed to a system implemented at the data center hosting one or more data servers. Of course, it is contemplated that the system may be positioned remotely from the data center and along the communication path to/from the data center. This system is adapted to intercept incoming Request messages in order to gather information concerning the attributes of the client device and to intercept outgoing content from the data center in order to modify the requested content based on these attributes. Such modifications are performed prior to receipt of such content by the client device in order to improve the viewing and/or listening experience by the recipient and ease processing requirements of the client device.

In the following description, certain terminology is used to describe certain features of the invention. For instance, the term "logic" is a general representative of hardware and/or software configured to perform one or more functions. One example of logic is a processing subsystem that is a collection of hardware and software featuring at least one processor (e.g., microprocessor, application specific integrated circuit, a digital signal processor, a micro-controller, field programmable gate array, etc.), finite state machine, combinatorial logic, or the like. "Software" is generally defined as a series of executable instructions in the form of an application, an applet, or even a routine. The software may be stored in any type of machine readable medium such as a programmable electronic circuit, a semiconductor memory device such as volatile memory (e.g., random access memory, etc.) and/or non-volatile memory such as any type of read-only memory "ROM", flash memory, a portable storage medium (e.g., USB drive, optical disc, digital tape), or the like.

The term "message" represents information configured for transmission over a network. One type of message is a frame that is generally defined as a group of bits of information collectively operating as a single data unit. The term "content" includes video, audio, images or any combination thereof.

Referring to FIGS. 1A and 1B, exemplary embodiments of a data center 100 that support the downloading of content is shown. Data center 100 receives requests for content from one or more (N≥1) client devices $130_1$-$130_N$ and downloads the content in accordance with the attributes of the client device initiating the request (e.g., client device $130_1$). The content is provided to client device $130_1$ over a network interconnect 140, which is a medium that supports communications over a network such as a wide area network (e.g., Internet, cellular-based network) or a local area network (LAN). According to one embodiment of the invention, the medium may be a wired medium (e.g., twisted pair, fiber optic, etc.) or over a wireless medium.

As shown in FIG. 1A, data center 100 comprises (i) an adaptive data processing system 110 in communication with both client devices $130_1$-$130_N$ and (ii) one or more (M≥1) data servers $120_1$-$120_M$. For instance, adaptive data processing system 110 may be located adjacent to data servers $120_1$-$120_M$ in the same area designated for the servers. For FIG. 1B, however, adaptive data processing system 110 is positioned remotely from data center 100, but along its transmission path to intercept messages from/to clients $120_1$-$120_M$. Of course, it is contemplated that adaptive data processing system 110 may also be implemented outside the transmission path as an IP endpoint device. For this embodiment, however, adaptive data processing system 110 would locate the data server $120_1$, . . . and/or $120_M$ with the desired content by issuing a DNS (Domain Name System) Request for the server hostname. The DNS Response would contain the IP address of that data server. Thereafter, when client devices $130_1$, . . . or $130_N$ issues the same DNS Request, the IP address of adaptive data processing system 110 is returned.

Adaptive data processing system 110 receives information that identifies the attributes of a client device (e.g., client device $130_1$) initiating a request for content. Upon receiving the requested content from data servers $120_1$, . . . , and/or $120_M$, adaptive data processing system 110 modifies this content in accordance to the attributes of client device $130_1$.

As an illustrative example, client device $130_1$ may be a portable electronic device, such as a cellular phone with WiFi capability for example. One example of a cellular phone with WiFi capability is an Apple® iPhone™ The Apple® iPhone™ may comprise a screen resolution of 480×320, iPhone™ operating system (OS) Ver. 2.1, 620 megahertz (MHz) ARM processor, 3G cellular network interface, and Safari™ Ver. 4.0 web browser. Upon detecting a Request message for content maintained by data center 100, such as a HTTP GET Request message or a RTSP Play message for a video file, adaptive data processing system 110 extracts information within the Request message to determine the attributes of client device $130_1$. Thereafter, the requested video file is retrieved from one or more data servers $120_1$, . . . , and/or $120_M$.

At data center 100, the video file is stored as a compressed video file in a selected resolution in lieu of being stored multiple times in different formats and/or with different resolutions. Thereafter, adaptive data processing system 110 matches the retrieved video file to the client device $130_1$ and transcodes the video file according to the up-to-date attributes of client device $130_1$. These attributes may include one or more of the following: processor type (ARM); base processing speed (620 MHz); processor load (% of processing utilized); OS type (iPhone™ OS); OS version (2.1); OS patch level; screen resolution (480×320); browser type (Safari™); browser version number (Ver. 4.0); instantaneous uplink speed (throughput from wireless connection); device orientation (which resolution dimension is oriented vertically); and available memory (amount of memory available) or the like.

Referring to FIG. 2, an exemplary embodiment of adaptive data processing system 110 that alters downloaded content according to the attributes of the requesting client device is shown. Adaptive data processing system 110 comprises a network interface 200, a network processing subsystem 210 and an A/V processing subsystem 220. Herein, network interface 200 includes logic to determine the destination and source of messages routed over interconnect 140. For instance, as one illustrative embodiment, network interface 200 may be implemented as an Ethernet interface to detect ingress Ethernet frames (IP packets) sent to data center 100.

Network processing subsystem 210 receives IP packets from network interface 200 and processes them. More specifically, for ingress traffic uploaded to data center 100, network processing subsystem 210 receives these IP packets over interconnect 140 and scans them for either a HTTP (GET or POST) Request message or a RTSP (PLAY) Request message. This may be accomplished by conducting a text-based search of the Request message.

Figure 3:
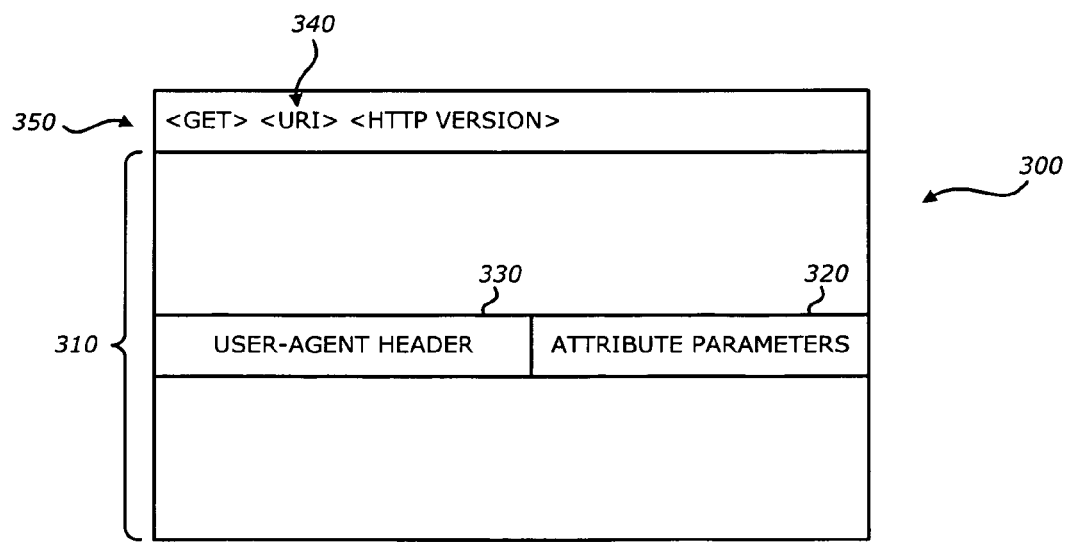
FIG. 3 is an exemplary embodiment of an HTTP Request message with the attribute parameters posited as values of the User-Agent Header within the HTTP Request message.

Upon detecting a Request message for downloaded content, network processing subsystem 210 extracts information within this message in order to determine the attributes of the client device initiating the request and store the information concerning these attributes (e.g., attribute parameter) within memory accessible by subsystem 210. According to one embodiment of the invention, as shown in FIG. 3, attributes of the client device may be placed within an HTTP header 310 of an HTTP Request message 300. Herein, each HTTP header 310 includes name/value pairs that appear in HTTP Request message 300 to identify the client device and to control how content is returned based on the attribute parameters 320 contained within the HTTP header 310.

As an illustrative example, HTTP Request message 300 may be represented as shown below in Table A. The name of each HTTP header is separated from its value by a single colon.

TABLE A

GET /video/animals.flv HTTP/1.1,
Accept: */*
Accept-Language: en
Accept-encoding: gzip, deflate
Connection: Keep-Alive
Host: www.pixel8networks.com
User-Agent: Safari 4.0; iPhone 2.1; ARM 680 MHZ;
Resolution 480×320

Herein, the HTTP Request message has a simple text based structure. The first line, known as the request line, contains (i) the HTTP method, GET; (ii) the relative URI of the resource (or a full URL if HTTP proxy is used); and (iii) the version of HTTP that is being used.

Herein, User-Agent header 330 is associated with values that supply adaptive data processing system 110 of FIG. 2 with information about the type of browser making the request and additional information pertaining to the capabilities (attribute parameters) of the client device sending the Request message. Herein, the User-Agent header 330 identifies that the client device features a Safari™ browser (version 4.0); iphone OS (version 2.1); 620 MHZ base processing speed; 480×320 display resolution.

Once the attributes are determined, adaptive data processing system 110 can return an HTTP Redirect message to the client device with a new URL that is derived from the attributes (e.g., /video/animals480×320H264.flv). This allows Content Delivery Networks (CDNs), such as Akamai™ based networks for example, to be able to cache the video with these attributes so that other devices with the same attributes can be serviced faster by the CDN. If the CDN does not have the video cached, the Request message is received by adaptive data processing system 110 which now transcodes the original video for the client device. The URL can be opaque as described below.

For egress traffic detected by network interface 200, network processing subsystem 210 scans for video, and parses the video into video frames. The video frames are sent to A/V processing subsystem 220 where compressed video frames or images are decompressed, perhaps reliance on one or more prior video frames to decompress a single subsequent frame. A/V processing subsystem 220 may be implemented with one or more graphic processor units (GPUs) to process the incoming content.

Any additional processing may be performed on the video associated with each video frame including segmenting the video into smaller sections (chunking), adding advertisement images to the video itself, watermarking, de-blocking, etc. Then, the resultant video segments are re-compressed (encoded), where multiple segments may be needed to compress an individual video segment. Network processing subsystem 210 then encapsulates the video segment into IP packets (Ethernet frames) and forwards them to the client device.

According to another embodiment of the invention, as also shown in FIG. 3, attributes of the client device may be placed within the URI 340 within the request line 350 of HTTP Request message 300. For instance, request line 350 may be represented in the following form as shown below in Table B:

TABLE B

GET/get_video?resolution=480×320&Processor=ARM&Speed=620& Device=iPhone&Interface=3G&video=animals.flv The parameters in the URL can be opaque, in other words, the client would hash (e.g., using SHA-1 or another one-way hash function) the attributes so that malicious users could not send arbitrary attributes in an attempt to crash the service. The URL would look be represented as shown in Table C:

TABLE C

GET/get_video?attributes=46578ABDE858409854&video=animals.flv

Figure 4:
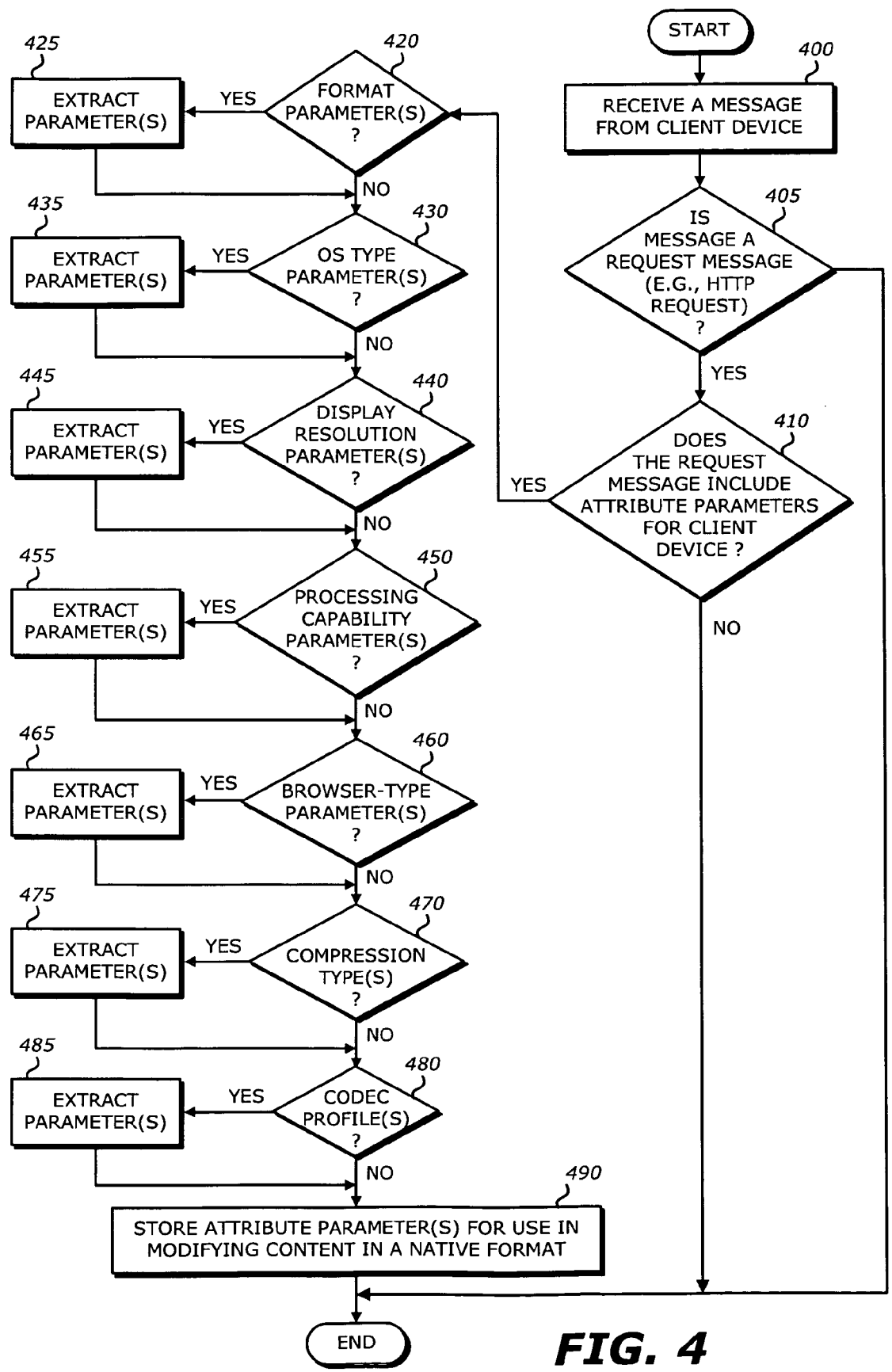
FIG. 4 is an exemplary embodiment of a flowchart that outlines operations performed by adaptive data processing system of FIG. 2 to recover and subsequently store attribute parameters of a client device requesting the content.

Referring to FIG. 4, an exemplary embodiment of a flowchart that outlines operations performed by adaptive data processing system 110 of FIG. 2 to recover and subsequently store attribute parameters of a client device requesting content is shown. Herein, the adaptive data processing system receives a message and determines if the message is a Request message for content such as an HTTP GET Request for example (blocks 400 and 405). If so, a determination is made whether the Request message features attribute parameters for the client device initiating the Request message (block 410).

Upon determining that the Request message includes the client device's attribute parameters, the adaptive data processing system parses through the Request message to extract these parameters. The attribute parameters may include, but are not limited or restricted to one or more of the following: format of the content such as flash "flv", Windows® Media Video "wmv", MP4 or the like (blocks 420&425); OS type such as Windows® XP® SP2, MacOS X, iphone or the like (blocks 430&435); display resolution such as 1080p (1920× 1080 progressive), 1080i (1920×1080 interlaced), 640×480, 480×320, or the like (blocks 440&445); device processor speed such as 1 GHz, 300 MHz, or the like (blocks 450&465); browser type such as Internet Explorer®, Mozilla™, Chrome™ or the like (blocks 460&465); compression type such as H.264, H.263, H.261, MPEG-2, Theora, Sorenson, VC-1, VP6 or the like (blocks 470&475); and profile (per codec) such as H.264 baseline, main or the like (blocks 480&485).

Of course, it is contemplated that other attribute parameters for the client device may be placed within the Request message, where such parameters are useful to properly transcode the downloaded content into a native format to enhance the viewing or auditory playback of the content or reduce processing requirements at the client device. These attributes may be processor type or OS version; level (per profile) such as 1 or 1.1; bitrate (sustained bandwidth required for video); and/or constant bit rate "CBR" or variable bit rate "VBR" setting.

As further shown in FIG. 4, the detected attribute parameters are stored for subsequent consideration and potential use when transcoding the received content from a targeted data server that is in communications with one or more data servers (block 490).

Figure 5:
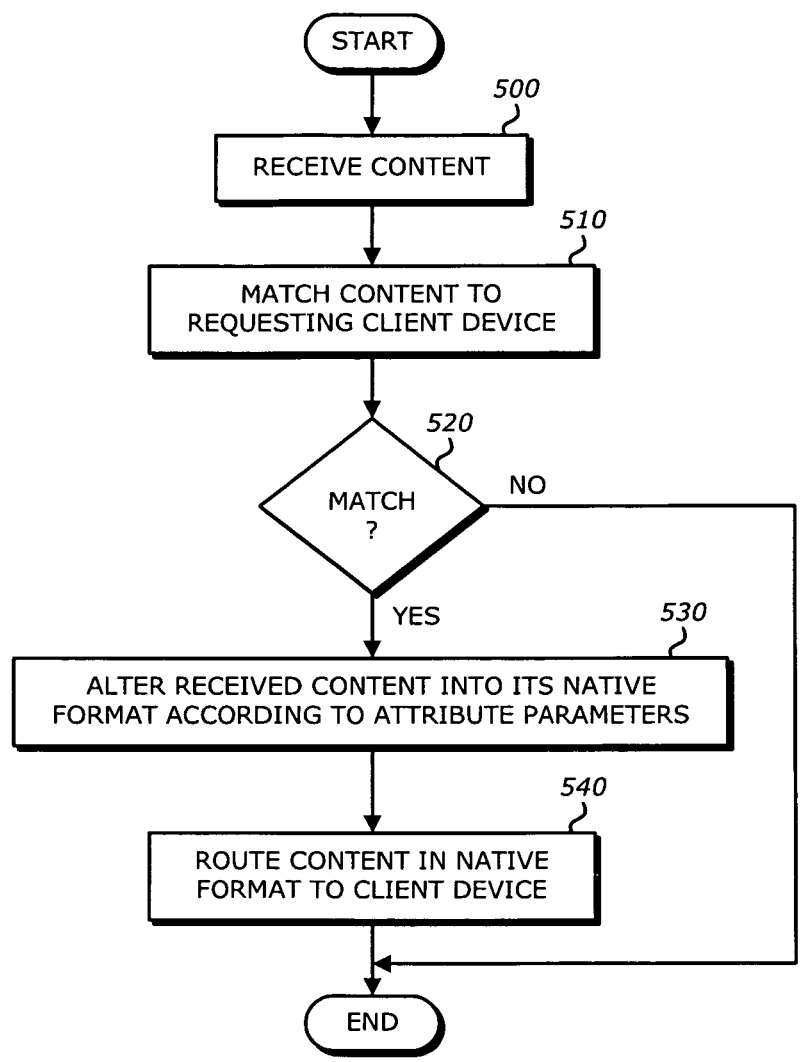
FIG. 5 illustrates an exemplary embodiment of a flowchart that outlines operations performed by the adaptive data processing system of FIG. 2 to transcode content to be downloaded into a native format utilized by the client device.

Referring now to FIG. 5, an exemplary embodiment of a flowchart that outlines operations performed by the adaptive data processing system of FIG. 2 to transcode content to be downloaded into a native format utilized by the client device is shown. Herein, the adaptive data processing system receives content from one or more data servers (block 500). The received content is matched with the client device initiating the request for such content (block 510). After a match is determined, the content is modified in accordance with the attribute parameters associated with the client device (blocks 520 and 530). This places the content into the native format of the client device. Thereafter, the content with the native format is routed to the client device (block 540).

Figure 6:
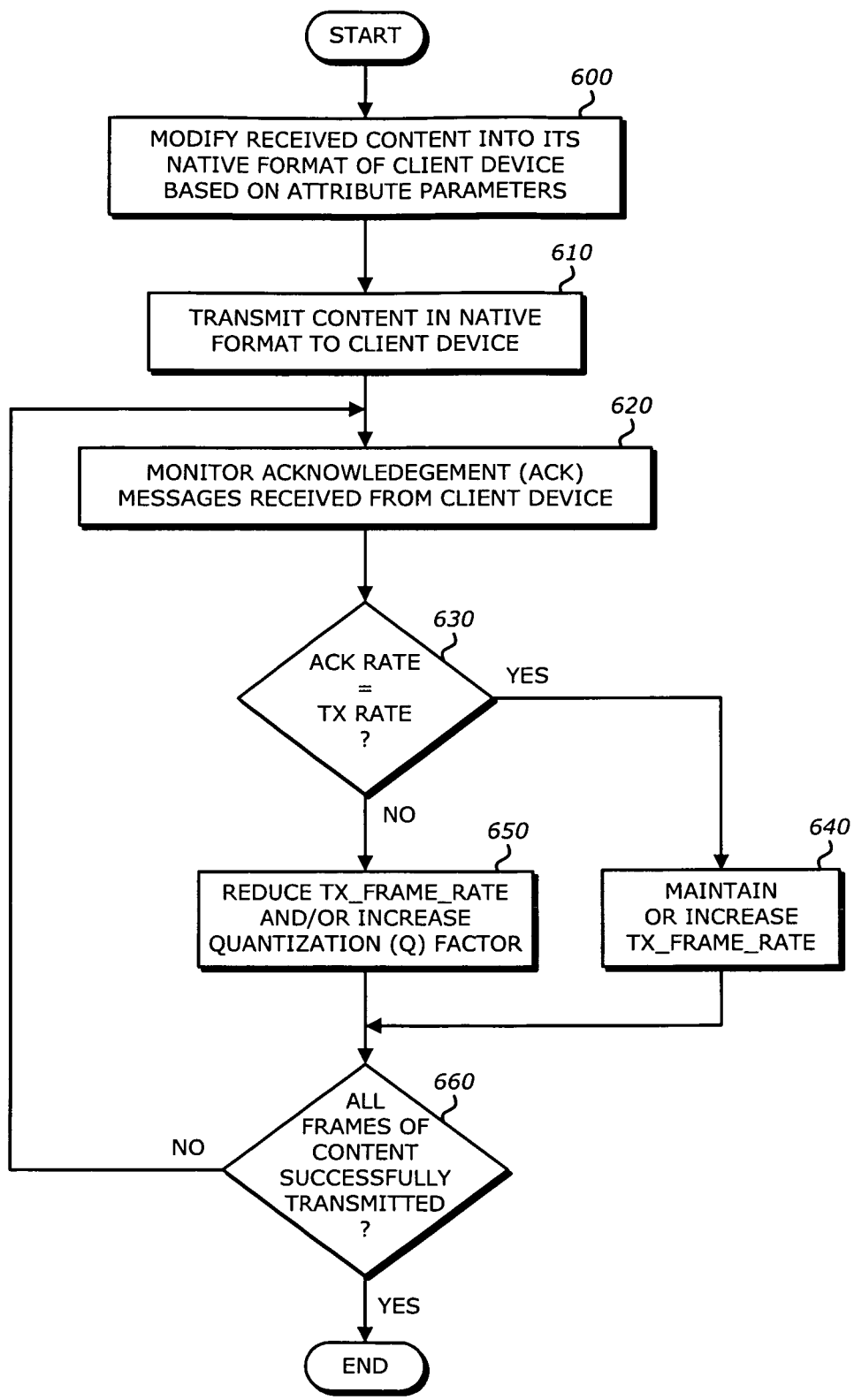
FIG. 6 is an exemplary embodiment of a flowchart that outlines operations performed by the adaptive data processing system of FIG. 2 to dynamically throttle the transmission rate of the content in its native format.

Referring now to FIG. 6, an exemplary embodiment of a flowchart that outlines operations performed by the adaptive data processing system of FIG. 2 to dynamically throttle the transmission rate of the content in its native format is shown. Herein, before transmission, the received content is modified by the adaptive data processing system into its native format based on the attribute parameters of the client device (block 600). The content in its native format is transmitted to the targeted client device (block 610). During transmission, the adaptive data processing system receives acknowledge (ACK) return messages from the client device (block 620).

As an example, for transmissions in accordance with Transmission Control Protocol (TCP), the ACK return messages may be TCP ACK messages that are designed to acknowledge receipt of every downloaded packet message forming the video file by the client device asserting the ACK bit and appropriating setting the ACK number field within the TCP header of the TCP ACK return message. Of course, for transmissions in accordance with Real-Time Transport Control protocol (RTCP), a NACK return message is used to acknowledge loss of a downloaded packet message.

After receipt of the ACK return message, a determination is made whether the rate of receipt of these ACK messages (ACK rate) is less than the rate of transmission of the downloaded frames of content (transmission "TX" rate) to the client device (block 630). If not, the content continues to be transmitted at the TX rate (or perhaps a greater frame rate if upward rate throttling is available) as shown in block 640. However, if the ACK rate is less than the TX rate, the TX rate is throttled. According to one embodiment of the invention, such throttling involves adjustment of the transmit frame rate being a ratio of the frames transmitted and a measured time for such frame transmissions (TX_Frame_Rate) and/or quantization (Q) factor since it is noted that as the Q factor increases, the quality of the video decreases thereby lowering the realized bit rate (block 650).

Herein, according to this embodiment of the invention, the throttling comprises initially reducing the frame rate, normally at a transmission rate of twenty-four (24) frames per second, downward to a rate not less than ten (10) frames per second or a value configured by or for the customer at the client device (block 650). Thereafter, if the ACK rate is still greater than the TX rate, the Q factor is increased, which lowers the quality of the decoded content until the ACK rate is equal to the TX rate. This process continues until all of the content has been successfully transmitted to the client device (block 660).

Figure 7:
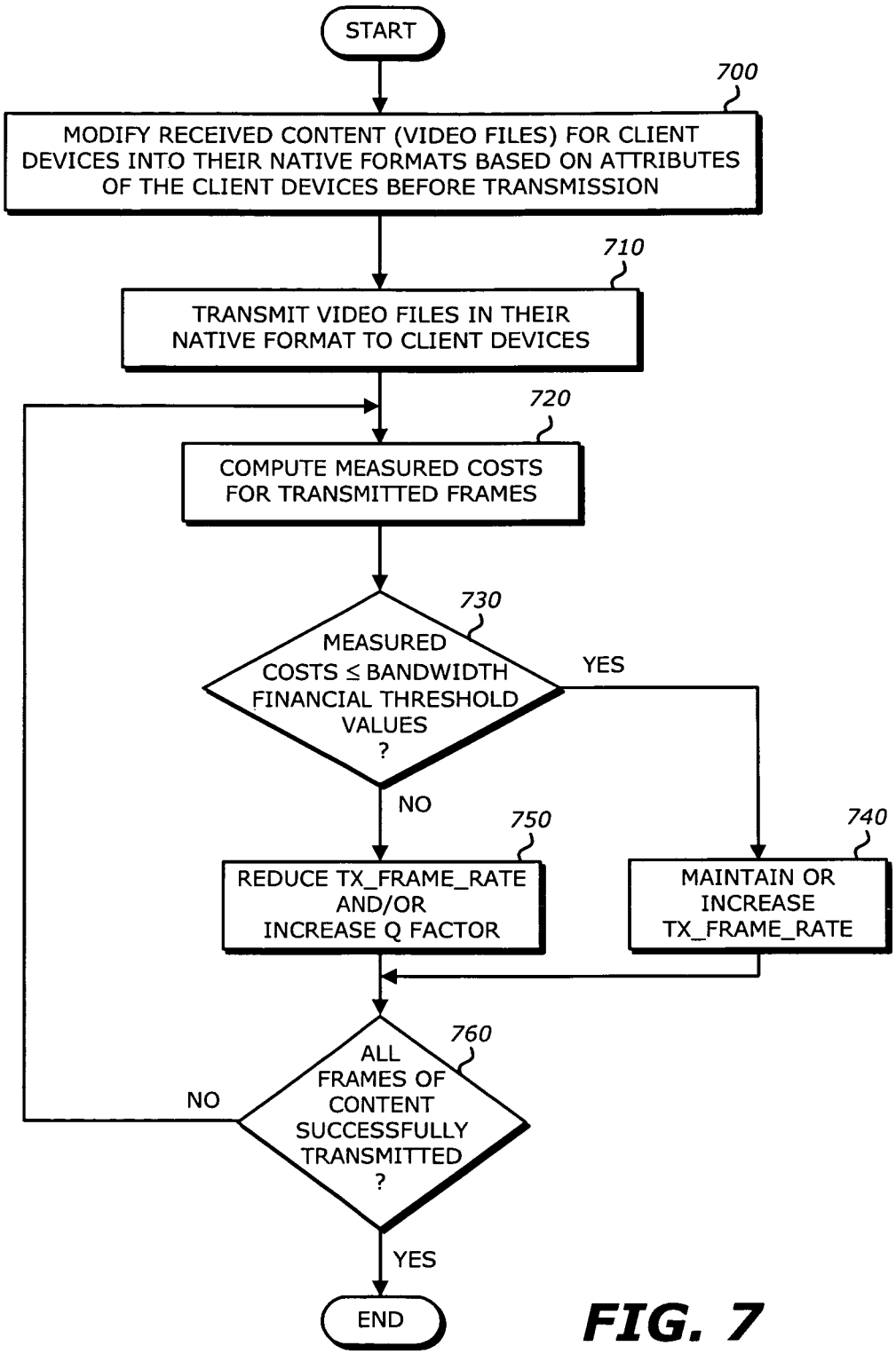
FIG. 7 is an exemplary embodiment of a flowchart that outlines operations performed by the adaptive data processing system of FIG. 2 to dynamically throttle the transmission rate of content in order to account for fiscal constraints.

Referring to FIG. 7, an exemplary embodiment of a flowchart that outlines operations performed by the adaptive data processing system of FIG. 2 to dynamically throttle the transmission rate of content (e.g., video files) in their native format in order to account for fiscal thresholds (e.g., fiscal constraints or targets) is shown. Herein, before transmission, video files requested by a plurality of client devices are modified in parallel by the adaptive data processing system and placed into their native format based, at least in part, on the attribute parameters of their requesting client device (block 700). The video files, each in their native format, are transmitted as frames to their targeted client devices (block 710). In order to minimize wasted bandwidth if the client discontinues watching/downloading the video files, the TX rate is set so that it never exceeds the original video frame rate or the adjusted frame rate (TX_Frame_Rate) described in FIG. 6.

A determination is made whether the measured costs associated with the TX rate exceeds a bandwidth financial threshold value (blocks 720 and 730). The measured costs are computed by summing the transmission costs associated with the video files transmitted at the set TX rate, where the costs are computed based on one or more of the following: (1) the route or path (for example the BGP autonomous-system path) undertaken by the video file to the client device, and (2) the time of day of the transmission.

If the measured costs do not exceed the bandwidth financial threshold value, the video files continue to be transmitted at current frame rate (or perhaps a greater frame rate if upward rate throttling is available) as shown in block 740. However, if the measured costs are greater than the bandwidth financial threshold value, the transmission rate is throttled. According to one embodiment of the invention, such throttling involves adjustment of the frame rate and/or Q factor as described above (block 750).

This process set forth in blocks 720-740 continues until all of the packets formulating the video files have been successfully transmitted to the client device (block 760).

While the invention has been described in terms of several embodiments, the invention should not be limited to only those embodiments described, but can be practiced with modification and alteration within the spirit and scope of the appended claims.

What is claimed is:
1. A method comprising:
 intercepting at an adaptive data processing system a request for video content sent from a client device to a data server, wherein the adaptive data processing system is distinct from and transparent to the client device and the data server, wherein intercepting the request comprises receiving attribute parameters that identify specific characteristics of the client device;
 intercepting video content output by the data server at the adaptive data processing system;

determining that the intercepted video content was output by the data server in response to the request;

modifying the intercepted video content according to the attribute parameters; and transmitting the modified video content to the client device;

wherein the data server stores video content in a selected resolution and a selected format to reduce the storage space needed for the video content; and wherein dynamically modifying the video content facilitates easing the processing requirements of the client device.

2. The method of claim 1, wherein one of the attribute parameters is a parameter that identifies a screen resolution of the client device.

3. The method of claim 2, wherein one of the attribute parameters is a parameter that identifies at least one of a type of and a version number of an operating system executed on the client device.

4. The method of claim 3, wherein two of the attribute parameters include parameters that identify a processor type and base processing speed of a processor implemented within the client device.

5. The method of claim 3, wherein one of the attribute parameters is a parameter that identifies a type of browser executed on the client device.

6. The method of claim 1, wherein the request is a Hypertext Transfer Protocol (HTTP) GET Request message that includes a header containing the attribute parameters.

7. The method of claim 1, wherein the request is a Hypertext Transfer Protocol (HTTP) GET Request message that includes a uniform resource indicator within a request line of the HTTP Request message, the uniform resource indicator includes the attribute parameters.

8. The method of claim 1, wherein the transmitting of the modified video content includes transmitting a plurality of frames that collectively include payload data being the modified video content.

9. The method of claim 8 further comprising:

receiving acknowledgement messages for frames downloaded to the client device; and reducing a transmission rate for the frames including the modified video content if a rate of receipt of the acknowledgement messages is less than the transmission rate.

10. The method of claim 9, wherein the transmission rate is reduced by either (1) reducing a transmit frame rate being a rate of transmission for frames forming the modified video content, or (2) increasing a quantization factor, or (3) reducing the transmit frame rate and increasing the quantization factor.

11. A system comprising:

a data server to store video content, wherein the data server stores video content in a selected resolution and a selected format to reduce the storage space needed for the video content;

a client device that requests video content from the data server; and an adaptive data processing system that is distinct from and transparent to the client device and the data server, wherein the adaptive data processing system includes:

a network interface including logic to intercept and determine a destination of an incoming message, a first processing subsystem to scan the intercepted incoming message to determine whether the incoming message is a Request message sent by the client device requesting a download of the video content from the data server, and a second processing subsystem to extract information within the Request message in order to determine specific characteristics of the client device;

wherein the first processing subsystem is further configured to intercept video content output by the data server;

wherein the second processing subsystem is further configured to:

determine that the intercepted video content was output by the data server in response to the Request message;

modify the intercepted video content by dynamically transcoding the intercepted video content for the client device according to the received attribute parameters; and transmit the modified video content to the client device; and wherein dynamically transcoding the video content facilitates easing the processing requirements of the client device.

12. The system of claim 11, wherein the second processing subsystem to modify the video content to be downloaded according to one of the attribute parameters being a parameter that identifies a screen resolution of the client device.

13. The system of claim 12, wherein the second processing subsystem to modify the video content to be downloaded according to one of the attribute parameters being a parameter that identifies a type of browser executed on the client device.

14. The system of claim 11, wherein the Request message is a Hypertext Transfer Protocol (HTTP) GET Request message that includes a header containing the attribute parameters.

15. The system of claim 11, wherein the Request message is a Hypertext Transfer Protocol (HTTP) GET Request message that includes a uniform resource indicator within a request line of the HTTP Request message, the uniform resource indicator includes the attribute parameters.

16. The system of claim 11, wherein the adaptive data processing system is dedicated hardware directly coupled to and housed in a same area as the at least one data server.

17. A non-transitory computer-readable storage medium storing instructions that when executed by a processor of cause the processor to perform a method, the method comprising:

intercepting at an adaptive data processing system a request for video content sent from a client device to a data server, wherein the adaptive data processing system is distinct from and transparent to the client device and the data server, wherein intercepting the request comprises receiving attribute parameters that identify specific characteristics of the client device;

intercepting video content output by the data server at the adaptive data processing system;

determining that the intercepted video content was output by the data server in response to the request;

modifying the intercepted video content according to the attribute parameters; and transmitting the modified video content to the client device;

wherein the data server stores video content in a selected resolution and a selected format to reduce the storage space needed for the video content; and wherein dynamically modifying the video content facilitates easing the processing requirements of the client device.

18. The method of claim 1, wherein transmitting the modified video content further comprises:
  throttling the transmit rate of the modified video content to not exceed the video frame rate of the video content;
  wherein throttling the transmit rate minimizes wasted bandwidth if the client device discontinues downloading the video content and reduces financial bandwidth costs for the data server.

19. The method of claim 1, wherein the method further comprises:
  redirecting the request to a new URL that specifies the attribute parameters associated with the modified video content; and
  wherein redirecting the request to the new URL facilitates caching the modified video content in a content delivery network.

20. The method of claim 1, wherein intercepting the message further comprises:
  issuing a domain name system request that redirects requests sent to the data server to the adaptive data processing system; and
  wherein redirecting requests sent to the data server facilitates transparently modifying video content for the client device without needing to reconfigure the device and the data server.

* * * * *